J. F. HOLTZEN.
DRAFT ATTACHMENT.
APPLICATION FILED SEPT. 9, 1910.
1,021,314.
Patented Mar. 26, 1912.
2 SHEETS—SHEET 1.
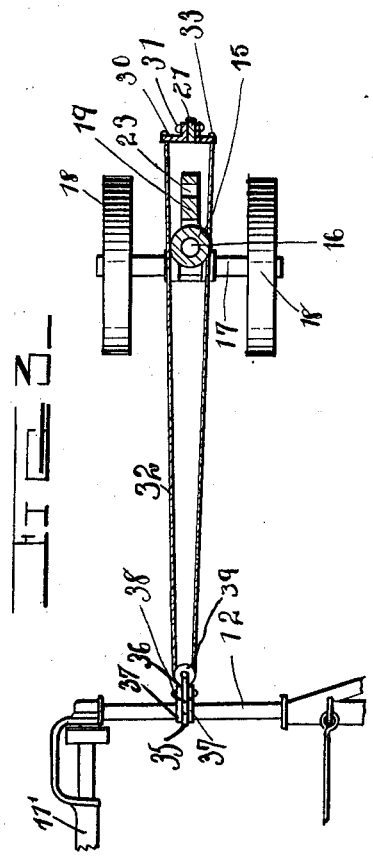
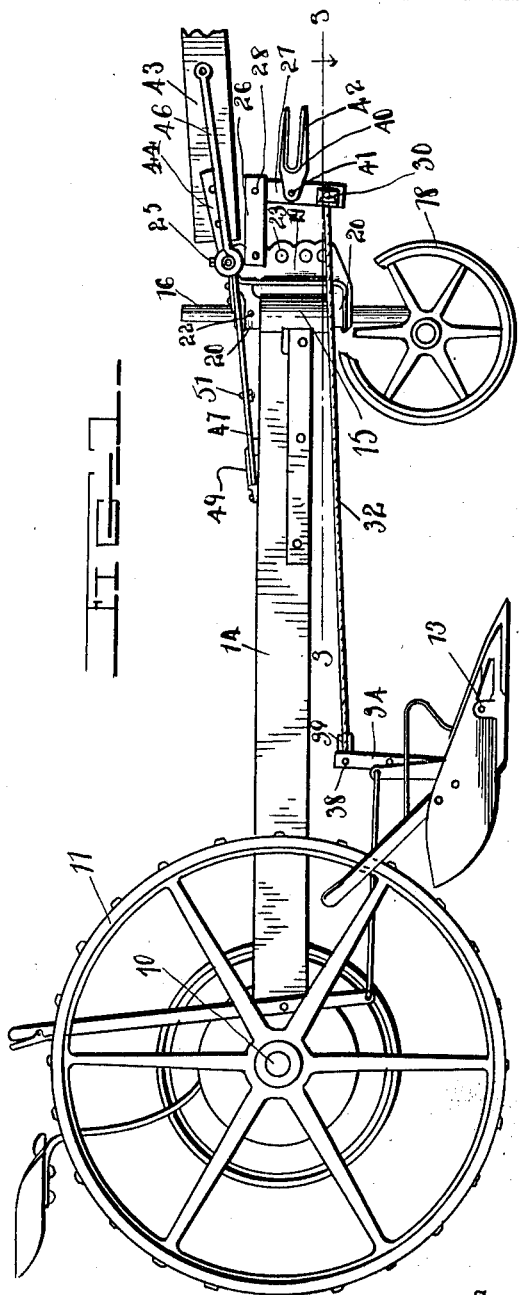
Witnesses
E. H. Boeckh
Francis Boyle
Inventor
John F. Holtzen.
By [signature]
Attorney J. F. HOLTZEN.
DRAFT ATTACHMENT.
APPLICATION FILED SEPT. 9, 1910.
1,021,314.
Patented Mar. 26, 1912.
2 SHEETS—SHEET 2.
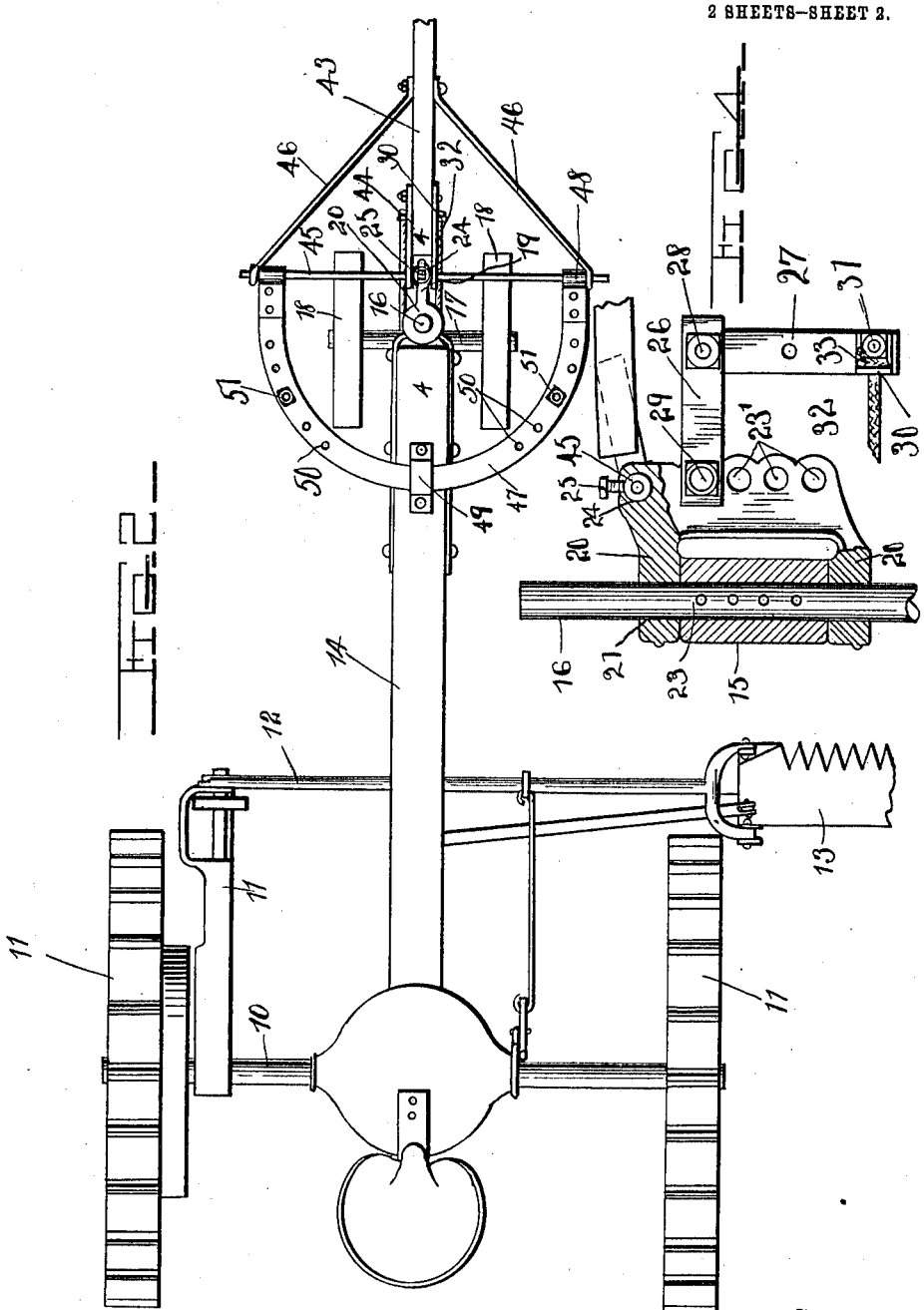
Witnesses
C. H. Boeckh
Francis Boyle
Inventor
John F. Holtzen.
Attorneys

UNITED STATES PATENT OFFICE.

JOHN F. HOLTZEN, OF ORLANDO, OKLAHOMA.

DRAFT ATTACHMENT.

1,021,314.  Specification of Letters Patent.  Patented Mar. 26, 1912.

Application filed September 9, 1910. Serial No. 581,238.

*To all whom it may concern:*

Be it known that I, JOHN F. HOLTZEN, a citizen of the United States, residing at Orlando, in the county of Logan, State of Oklahoma, have invented certain new and useful Improvements in Draft Attachments; and I do hereby declare the following to be a full, clear, and exact description of the invention, such as will enable others skilled in the art to which it appertains to make and use the same.

This invention relates to draft attachments, more particularly to draft attachments for harvesting machines and has for an object to provide a draft attachment that will connect a double tree to the drag bar of a mowing machine so that the pull will be distributed equally between the draft tongue of the machine and the drag bar.

A further object of the invention is to provide a device of this character that will bind against the beam of the mowing machine when the tongue is swung to such a position that the draft animals are in danger of treading upon the sickle bar.

With the above object in view the invention consists of the novel details of construction and combination of parts hereinafter fully described and claimed, it being understood that slight modifications may be made within the scope of the appended claims.

In the accompanying drawing forming part of this specification, Figure 1 is a side elevation of the mowing machine with my improved draft attachments applied thereto. Fig. 2 is a plan view of the mowing machine and applied draft attachments. Fig. 3 is a cross sectional view taken on the line 3—3 Fig. 1. Fig. 4 is an enlarged longitudinal view taken on the line 4—4 Fig. 2, with parts removed.

Referring now to the drawing a mowing machine is shown comprising an axle 10 the opposite ends of which are equipped with ground wheels 11, a hollow arm 11' projecting forwardly from this axle and being equipped at its extremities with a drag bar 12 which supports a sickle bar 13. A beam 14 is connected at its rear end to the axle and its forward end is equipped with a vertically disposed tubular bearing 15 through which extends a turning pin 16, this pin rotating in the bearing and being equipped at its lower end with an axle 17, which is less in length than the axle 10 and is equipped at its opposite extremities with ground wheels 18, these ground wheels being of a size to freely swing underneath the beam. These parts are of the usual construction and form no part of the present invention.

A plate like draft iron 19 is provided on its opposite ends with outstanding tubular boxes 20, these boxes being provided centrally with alined openings 21 which snugly receive the stand pin 16, the uppermost of these boxes being equipped with a set screw 22, which engages in depressions 23 formed in the pin and rigidly secures the pin within the box while at the same time permitting of a longitudinal adjustment of the pin therewithin to support the forward end of the beam 14 any desired distance from the ground. The draft iron 19 is provided with a series of vertically arranged openings 23', and is further provided on its top edge with a horizontally disposed tubular bearing box 24, a set screw 25 being threaded through the top face of this box and projecting into the box. For connecting a double tree to this draft iron a pair of links 26 and 27 are arranged to project at approximately right angles from each other with their opposing ends overlapping, and a pivot pin 28 is passed through these overlapping ends to connect the links together. One of the links 26 is arranged to extend forwardly from the draft iron 19 and the free end of this link is provided with a pivot bolt 29 which is adapted to engage any particular one of the openings 23' in the draft iron. The free end of the mating link 27 is equipped at its free end with a pair of angle irons 30, one leg of each angle iron being engaged upon the outer face of the link and bolt. A rivet or similar connector 31 is passed through the juxtaposed legs of the angle irons and link to rigidly secure the parts together. Each angle iron is provided in its free leg with an opening. A flexible connector such as the cable 32 or the like is looped upon itself intermediate its ends and its terminals engaged through the openings in the free legs of the angle irons and then knotted as shown at 33, to prevent withdrawal of the cable.

A bracket 34 is arranged upon the drag bar 12, this bracket being formed of a collar 35 which encircles and is fixed to the drag bar and is provided with an upstanding lug 36. A pair of straps 37 are bolted to the side faces of this lug and are provided at their free extremities with a removable bolt 38. Connected to the bolt 38 is a sheave 39 and the intermediate portion of the cable 32 is trained over this sheave.

An attaching clevis 40 is provided at its bridge portion with a pair of parallel ears 41 which extend along opposite sides of the link 27, a bolt 42 being passed transversely through these ears and link to secure the parts together. A double tree of any preferred construction may be secured in this clevis and it is clear that when the pull is exerted upon a clevis that the link 27 will have tendency to move forwardly and through the instrumentality of the cable 32 exert a pull upon the drag bar 12. It will be observed further that when the draft animals are swinging around a turn, through the instrumentality of the cable 32 being trained over the sheave 39, the cable will run freely through the sheave and will not cause a corresponding swinging movement of the drag bar.

The draft tongue 43 is provided at its root with a pair of straps 44, these straps having openings which aline with the bore of the tubular bearing 24. An approximately straight rod 45 formed of gas pipe or the like is passed through the registering openings in the straps and bore of the bearing, the set screw 25 then being screwed down to approximately the central portion of this bar to rigidly hold the bar in place. A pair of inclined brace rods 46 are secured at their opposite ends to the draft tongue and ends of the bar 45 and reinforce the bar against bending. An arcuate bar 47 is provided at its extremities with eyes 48 which encircle the bar 45 adjacent the opposite extremities of the latter. The intermediate portion of this bar over lies the top face of the beam 14, and a U-shaped strap 49 is straddled over the intermediate portion of the arcuate bar and is provided with outturned extremities which are bolted to the top face of the beam. This strap holds the arcuate bar against moving vertically and performs the function of a guide to direct the sliding movement of the arcuate bar when the draft tongue is swinging. The object of this arcuate bar is to limit the swinging movement of the draft tongue and to accomplish this, it is provided with a plurality of spaced openings 50 adjacent to its opposite extremities and through any particular opening upon either side of the strap, a bolt 51 is engaged which binds against the bracket 48 just before the arcuate rod has advanced therethrough a sufficient distance to permit of the draft animals stepping upon the sickle blade. These bolts may be engaged through any particular opening when desired that will permit of the draft tongue swinging to only a predetermined extent so as to prevent the tendency of the machine to tip when working on hills.

It will be seen from the above that the draft pull through the instrumentality of the bar 45 transmits a pull to the machine and that the double tree securing links through the instrumentality of the cable transmit a pull to the drag bar so that the draft is approximately evenly distributed between these two parts.

What is claimed, is:—

1. The combination with a mowing machine having a drag bar, of a draft appliance comprising a link mounted on a substantially horizontal pivot carried by the machine, a depending link pivotally attached to the first named link, evener securing means on said depending link, a flexible element directed upon itself to form a loop, the terminals of said loop being connected to said depending link, a sheave secured to said drag bar engaging the bight of said loop, said sheave being disposed in a substantially horizontal plane.

2. The combination with a mowing machine having a drag bar, of a draft appliance comprising a vertically rocking link adjustably attached to the machine, a depending link pivotally connected to the first named link, evener securing means on said depending link, lateral projections on said depending link near the free end thereof, a flexible element directed upon itself to form a loop, the terminals of said loop being connected to said projections, and a sheave secured to said drag bar engaging the bight of said loop.

In testimony whereof, I affix my signature, in presence of two witnesses.

JOHN F. HOLTZEN.

Witnesses:
B. E. KINCAID,
L. J. ANTHIS.

Copies of this patent may be obtained for five cents each, by addressing the "Commissioner of Patents, Washington, D. C."